Aug. 30, 1938.   T. O. HALL   2,128,743
HIGH INTENSITY PROJECTOR LAMP AND ARC
Filed Feb. 3, 1934   4 Sheets-Sheet 1
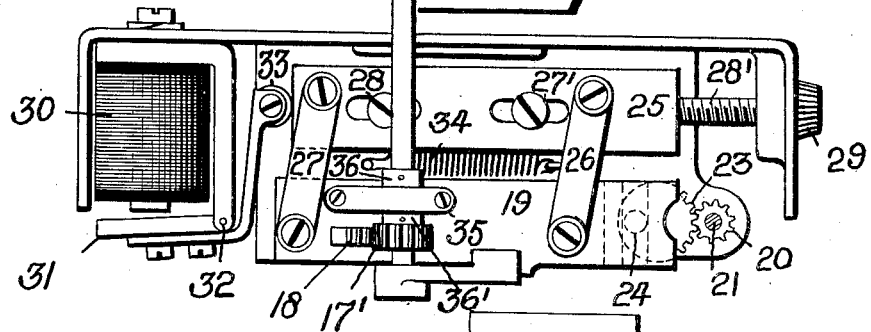
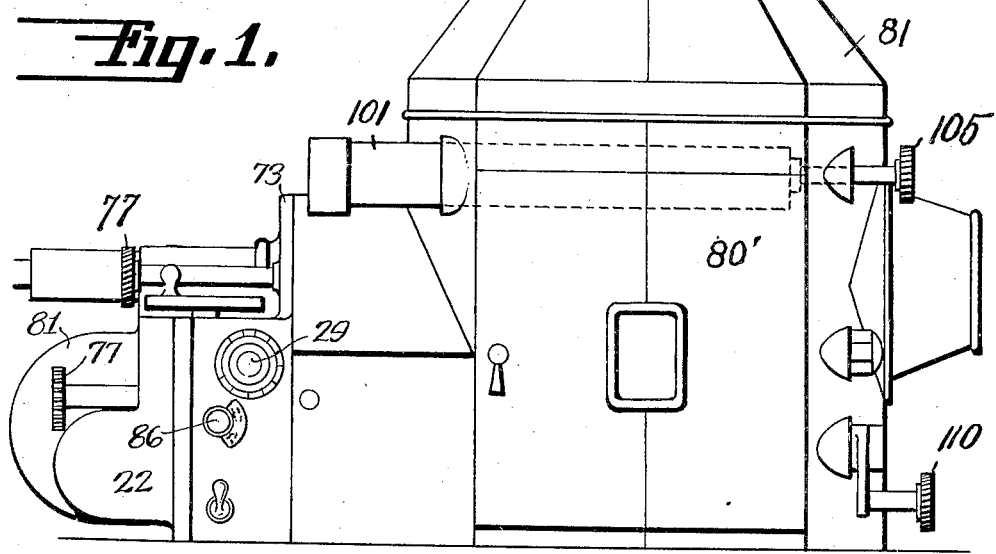
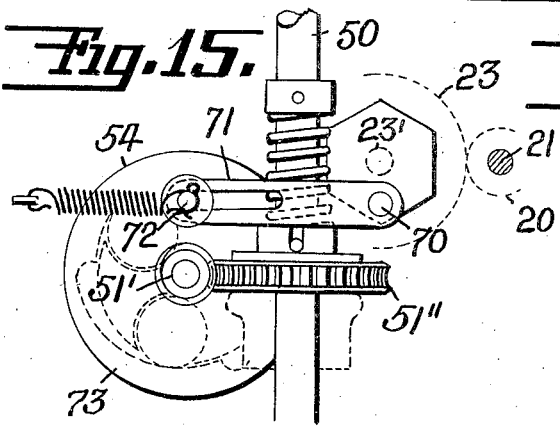
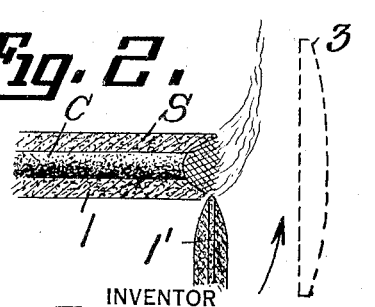
INVENTOR
THEODORE O. HALL
BY
*Herbert H. Thompson*
HIS ATTORNEY

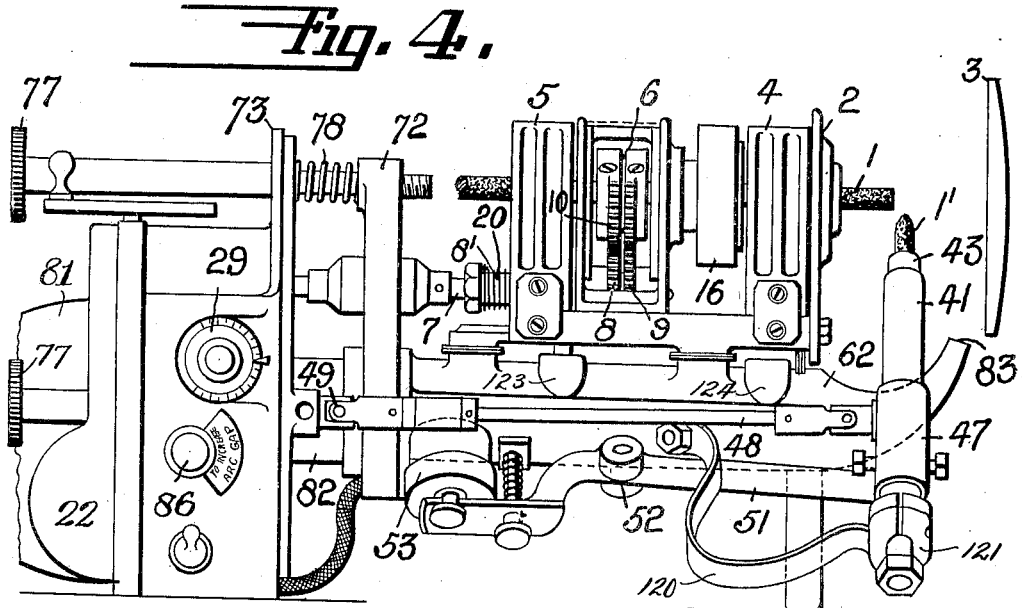
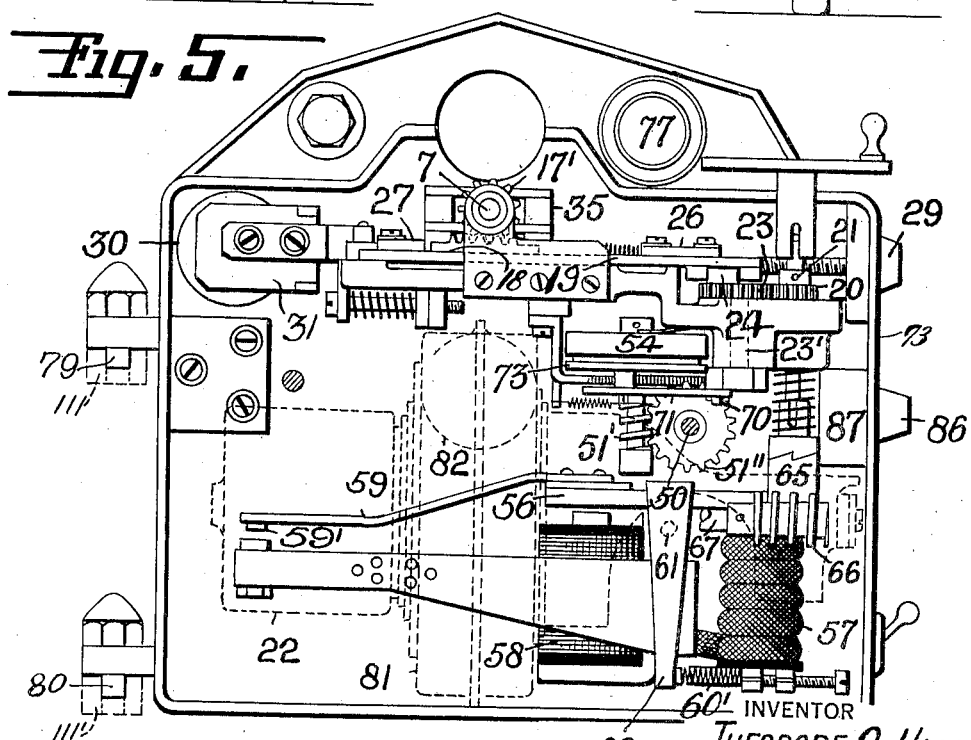

Aug. 30, 1938.  T. O. HALL  2,128,743
HIGH INTENSITY PROJECTOR LAMP AND ARC
Filed Feb. 3, 1934  4 Sheets-Sheet 3
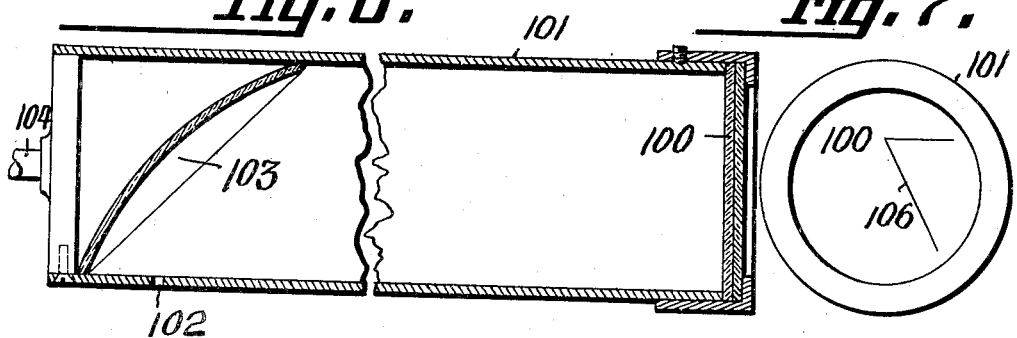
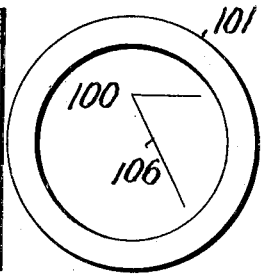
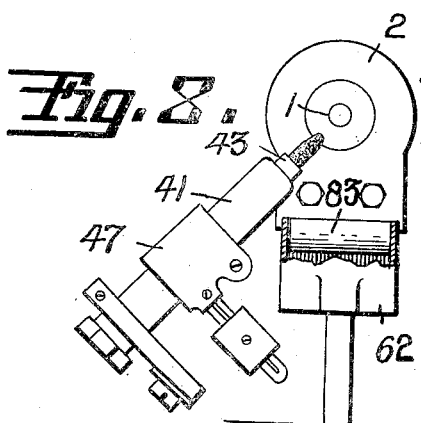
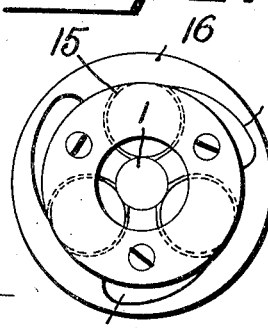
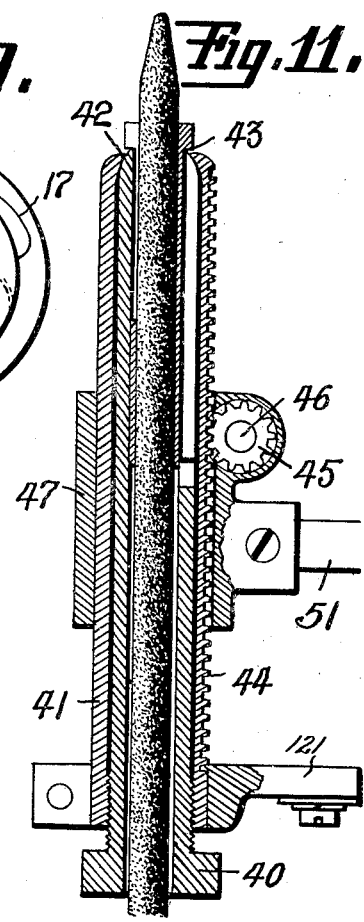
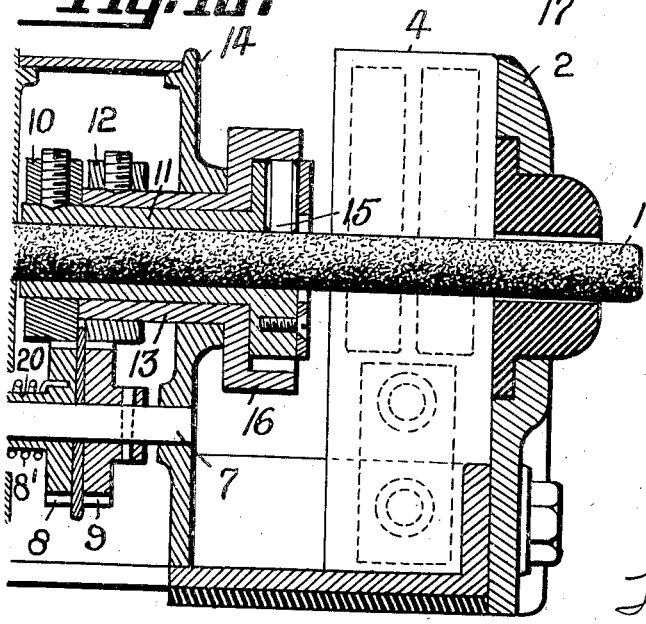
INVENTOR
THEODORE O. HALL
BY Herbert H. Thompson
HIS ATTORNEY Aug. 30, 1938.  T. O. HALL  2,128,743
HIGH INTENSITY PROJECTOR LAMP AND ARC
Filed Feb. 3, 1934  4 Sheets-Sheet 4
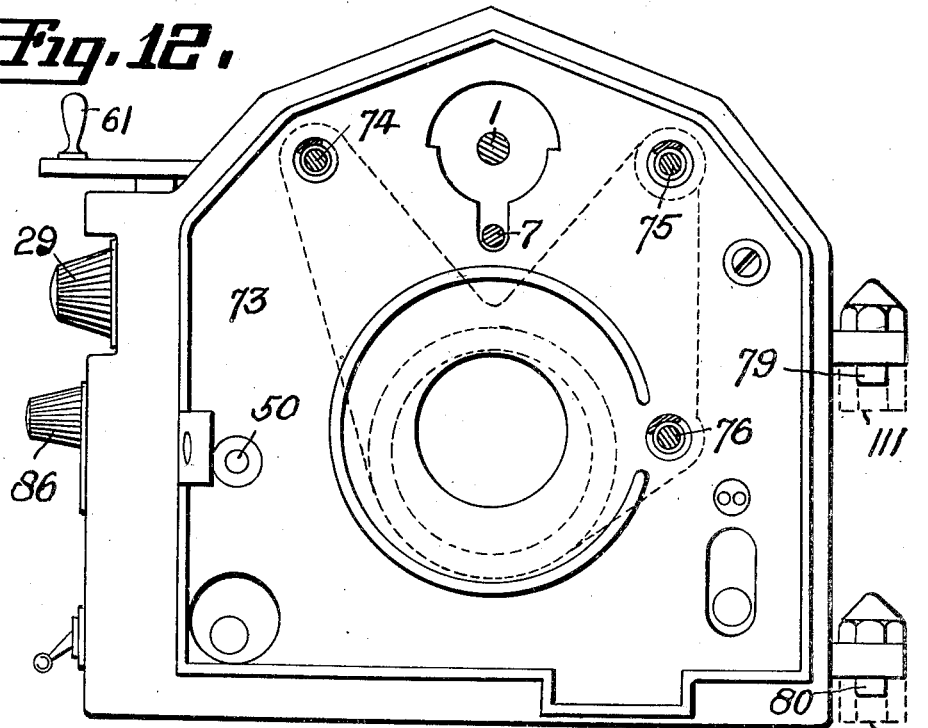
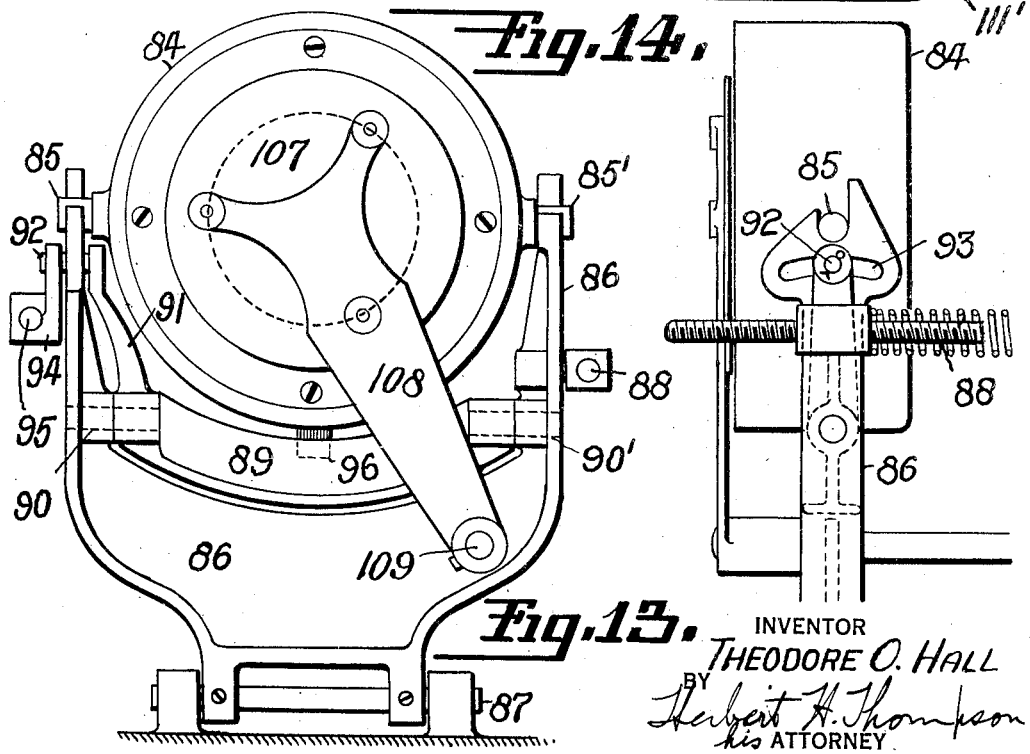
INVENTOR
THEODORE O. HALL
BY
Herbert H. Thompson
his ATTORNEY

UNITED STATES PATENT OFFICE 2,128,743

HIGH INTENSITY PROJECTOR LAMP AND ARC

Theodore O. Hall, Los Angeles, Calif., assignor to Hall & Connolly, Inc., New York, N. Y., a corporation of New York Application February 3, 1934, Serial No. 709,659

4 Claims. (Cl. 176—51)

This invention relates to high intensity flaming arc lights especially adapted for projection purposes, such as the projection of motion pictures. Projection lamps using the direct light from the crater of the positive electrode, which is collected by condenser lenses, have many advantages over the reflector type projection lamp in which the light rays are first collected and then reflected by a comparatively large parabolic reflector, because the quality of the light is superior in the former type and the shape of the projected beam is better suited to the objective lens and a large portion of the heat of the light is absorbed in the thick condenser lenses. In order to collect sufficient light in the direct system, I find it desirable to move the light source very close to the condenser and in order to do this I have devised a new form of high intensity lamp in which the negative electrode is placed in a plane at right angles to and closely adjacent the tip of the positive electrode and also preferably lies at a substantial angle to the perpendicular.

In addition, I have devised a novel mechanism for burning and controlling this type of arc especially suited for projector lamp purposes.

Referring to the drawings showing one form my invention may assume:

Fig. 1 is an exterior view of a complete projector lamp with a housing surrounding the same.

Fig. 2 is a view illustrating the burning of my new form of high intensity arc.

Fig. 3 is a detail of the feeding and rotating means for the positive electrode.

Fig. 4 is a side elevation of the lamp mechanism.

Fig. 5 is a rear elevation of the control mechanism, as mounted on the outside of the rear door, the rear cover of the control box having been removed.

Fig. 6 is a sectional detail of the arc image producing means.

Fig. 7 is a front view of the same.

Fig. 8 is a front view of the lamp.

Fig. 9 is a detail of the electrode gripping means which rotates and feeds the positive electrode.

Fig. 10 is a vertical section of the forward portion of the positive electrode holder showing the feeding and rotating means.

Fig. 11 is a sectional detail of the negative electrode holder.

Fig. 12 is an elevation, partly in section, of the rear door viewed from the opposite side from Fig. 5.

Fig. 13 is a front elevation of the condenser lens mounting.

Fig. 14 is a side elevation of the same.

Fig. 15 is a detail of the feeding means for the negative electrode.

Referring first to Fig. 2, there is here illustrated my preferred method of burning my high intensity arc in which the negative electrode 1' is placed at substantially right angles to the positive electrode 1. I operate the negative tip so close to the positive as to almost touch the rim of or shell S surrounding the positive crater without obstructing the light from the same and thus provide the lowest resistance possible from the tip of the negative to the flaming arc core C at the bottom of the positive crater. In this way the arc, when first struck and before the core is heated, takes current from the shell, then when the core becomes sufficiently hot so that vapor is issued from the same, the path of the current shifts from the shell to the core with a resultant sudden increase of brilliancy. The arc then burns very steadily and at extremely low arc voltage with a short, rather opaque, flame streaming out of the crater. Preferably also the positive electrode is rotated in steps and so timed with reference to the consumption of the carbon that the portion of the carbon crater edge adjacent to the negative tip burns away more than the rest of the crater rim, thus forming a slight hollow opposite the negative tip. The result is that the other two-thirds of the negative crater edge over-hang the negative tip and in this way a clearance space is provided so that the negative tip can approach the positive core much closer than would be otherwise possible. With this method of burning the arc, high intensity results may be secured with as low a voltage drop as 25 volts with 40 ampere current.

My preferred lamp construction for burning this arc is shown in general in Figs. 4 and 5. The positive electrode 1 is shown as mounted in a holder 2 so that its axis lies in the axis of the condenser lens 3. Current may be led into the electrode by heavy spaced split conducting blocks 4 and 5 which may lie one pair in front of and the other behind the gearing 6 for rotating the electrode. Such rotation is shown as secured from a shaft 7 operated by mechanism hereinafter described. Said shaft slowly rocks back and forth a pair of pinions 8 and 9. The former is not rigidly secured to said shaft but is coupled to the same through a spring 8' which is coupled at its outer end to a sleeve 20 secured to said shaft (Figs. 4 and 10). Said pinion 8 meshes with a segmental gear 10 secured to a sleeve 11 while pinion 9, rigidly secured to shaft 7, meshes with a segmental gear 12 secured to an outer sleeve 13 journalled in the open framework 14. The inner of said sleeves 11 is shown as housing within its forward extension a plurality of rollers 15, while the outer sleeve 13 is expanded at its outer end to form a head 16 enclosing the rollers. The inner surface of said head 16 is formed with a plurality of cam surfaces 17, one for each roller (Fig. 9). When the two sleeves are relatively rotated in opposite directions, the rollers wedge and grip the carbon. When, however, this relative rotation is reversed, the carbon is released. Therefore, as the shaft 7 is oscillated the electrode will be given a step-by-step rotation. The pinion 8 is biased in the direction to cause the rollers to grip the carbon in one direction and to release it in the other.

If at the same time the pinion shaft is thrust forward each time that it turns in the direction to grip the carbon, a combination of both rotation and feed will result. For feeding and rotating the positive electrode an extension of the shaft 7 is shown as oscillated by means of a pinion 17' thereon which meshes with a short rack 18 secured to a slide 19. Said slide is reciprocated from a pinion 20 on shaft 21 rotated from a power motor 22. Hand rotation and feed of the positive electrode may be effected through the handwheel 61 which may turn the shaft 21 of the pinion 20. Said pinion is shown as turning a gear 23 having an eccentric pin 24 thereon which engages a slot in the under surface of slide 19 to reciprocate the latter as the gear is revolved. Preferably the feed is actuated from this reciprocating motion of the slide 19. This is accomplished by giving the slide 19 a slight motion forward and backward with respect to the shaft 7 as it reciprocates laterally. One method of securing this result is by connecting the slide 19 to a second slide 25 by means of pivoted links 26 and 27. Since the slide 25 cannot move axially by reason of the pin and slot connections 27', 28, the slide 19 will move in an arc having a component axially of shaft 7, the extent of axial movement depending upon the relative lateral positions of the two ends of the links 26 and 27. The farther the upper pivot is offset with respect to the lower pivot, the greater the feed motion will be. The position of slide 25 in one direction is accordingly varied to suit the burning conditions by means of threaded shaft 28' operated from thumb piece 29. As an electro-magnet 30 may be provided to vary the feed from slow to fast feed when the lamp is operated with a control relay. To this end the magnet 30 is shown as provided with an armature 31 pivoted at 32, said armature having a roller 33 adapted to engage the far end of the slide 25 for holding the slide against the threaded stop shaft 28' when the magnet is excited against the action of the spring 34. The slight axial movement of the slide 19 may be imparted to the shaft 7 by means of a strap 35 extending over shaft 7 and between two collars 36, 36' secured to the shaft. Obviously the electrode may be fed in either direction by adjusting slide or plate 25.

The negative electrode holder is shown as comprising inner and outer sleeves 40 and 41, the former being split part way down its length and threaded at its rear end into the outer sleeve. Said sleeves have cooperating conical surfaces 42 adjacent the arc so that the electrode may be tightly gripped. If desired, a thin inner split sleeve 43 may be inserted between the sleeve 40 and the electrode near its end. The outer sleeve is shown as having rack teeth 44 along one side with which meshes a pinion 45 to feed the electrode. Current is led into the same through copper ribbon 120 and clamp 121. Said pinion is mounted on a shaft 46 journalled in the bracket 47 and having a universal connection with a shaft 48 leading through universal joint 49 to the shaft 50 entering the control box. The bracket 47 is shown as supported on an arm 51 pivoted at 52 and oscillated from striking magnet 53. It should be noted that the swinging of this arm in striking the arc is such that the negative tip travels in an arc the cord of which lies at about 45 degrees to the axis of the positive electrode. Such a movement of the negative in striking this type of arc is important to prevent the carbons from missing each other on the back stroke. From Fig. 8 it will also be observed that the negative not only lies in a plane perpendicular to the axis of the positive but also that it lies at an acute angle in said plane to aid in recarboning and to facilitate using a standard length carbon.

For controlling the negative feed, I employ a friction or over-running clutch or ratchet 54 which drives the negative feed shaft 50 in steps through worm 51'. Said clutch is operated from the shaft 21 which is driven from the motor through one-way clutch 65, the lower clutch face being secured to a wormwheel (not shown) turned from a worm 66 on the shaft 67 of said motor. On the lower end of the shaft 23' of gear 23 is a disc carrying an eccentric pin 70 which reciprocates slide 71 (Fig. 5 and Fig. 15), which has a slot in the other end thereof engaging a pin 72 on the disc 73 forming one element of the one-way ball or roller clutch 54. The driven element of said clutch turns the worm 51' driving the wormwheel 51'' on shaft 50.

The clutch or ratchet is accurately controllable as to length of stroke, since in this type of arc it is of the utmost importance that the negative tip hold its proper position with relation to the crater. On the other hand, the consumption of the negative electrode is not greatly affected by variations of current, since with my method of controlling the positive electrode by the arc wattage, the speed of the motor bears a definite relation to negative electrode consumption at varying currents.

The control relay is preferably made responsive to variations in both arc current and arc voltage and acts to close the circuit through the magnet 30 described above. The relay magnet is shown as comprising an armature 56 pivoted at 61 and two windings, one a series winding 57 and the other a shunt winding 58. The armature is also shown as having two arms, 59 extending to the left in Fig. 5 and on which is contact 59', and 60 extending downwardly in said figure. The armature is pivoted at 61 to the central upright portion of the T-shaped iron framework of the magnet and is centralized by spring 60'. Suitable stops may be provided to limit the control of the armature in each direction to determine the characteristic of the relay. Moving the stops to tilt the armature in a direction to shorten the gap at the shunt and to lengthen it at the series coil causes the relay to shorten the arc as the arc current increases. The relay is preferably adjusted so that increase of current lengthens the arc slightly but the adjustment may be made so that it will maintain a constant arc gap for wide variations in current. The arc gap may also be regulated by thumb piece 86 operating a small rheostat 87 in circuit with a shunt coil 58 on the relay. It should also be noted that in my type of arc no thermostat or other means is needed for maintaining the positive crater in the proper position with respect to collector lens since the fixed position of the negative with respect to the axis of the positive determines the position of the positive crater when the feed of the latter is properly controlled.

The main support for the lamp is formed by a tubular base or hollow horizontal standard 62 to which all parts of the lamp proper are secured. Said frame may be provided with exhaust vents at various locations along the lamp to cool the mechanism. Said base has secured to the rear end thereof a V-shaped casting 72 which is supported from the main base plate or upright 73 by a three point support comprising three threaded shafts 74, 75 and 76 (Fig. 12). Each of said shafts is provided with a thumb piece 77 so that the position of the lamp, both toward and away from the collector lens and also laterally, may be quickly and accurately adjusted. Helical springs 78 are shown to take up the lost motion in the threads. The extensions of the feed shafts 7 and 50 pass through said plate 73 and into the control box. Preferably an air vent 122 and 123 is placed under each contact member 4 and 5 to cool the same.

The entire control box may be hinged to the frame by hinge pins 79 and 80 so that by taking out the locking bolts the control box may be swung outwardly with the lamp attached thereto to swing the lamp toward one of the doors 80' of the main housing 81 for recarboning. The back plate 73, together with the entire lamp mechanism secured thereto, may be lifted upwardly to lift the hinge pins 79, 80 out of the hinge sockets 111, 111' on the lamp housing so that the entire lamp may be slid out backward from the housing. The outlet of the blower 81 mounted on the motor shaft is provided with a large pipe 82 which loosely enters the end of the hollow base 62. Air, therefore, passes through said base and the main portion thereof is discharged from a long narrow slot 83 in a flat upwardly bent nose against the inner surface of the collector lens 3 to cool the same and act as an air curtain between the arc and lens to prevent pitting of the lens by hot particles and also to bend the arc flames away from the lens and aid in maintaining the high intensity arc.

Preferably also the lens holder 84 is adjustably mounted in front of the arc. As shown it is supported on trunnions 85, 85' in a bracket 86 pivoted on shaft 87 at the base, the entire bracket being adjustable about said pivot by means of threaded shaft 88 and knob thereon. Under said lens holder is pivotally mounted a curved member 89 (Fig. 13) pivoted in bracket 86 on axis 90, 90'. Rising from said member on one side is an arm 91 having a pin 92 thereon passing through a slot 93 in bracket 86 to engage a threaded block 94 threaded on a shaft 95 for adjustment. The holder is also provided with a lug 96 which engages said loop at least on one side. By adjusting either or both of shafts 88, 95 it will readily be apparent that the lens holder may be moved to and from the arc with or without tilting the same.

For obtaining a view of the arc from without the housing 81, I have shown a small ground glass window 100 at the end of a tube 101 which extends from a point within the housing above and to one side of the arc through and without the housing 81 (Fig. 1) so that the arc image may be viewed on the finder. The tube is shown as having at its forward end a small peep hole 102 which throws an arc image on the reflector 103 which reflects the image on the window 100. Said tube may be supported at its forward end by a rod 104 which extends through the forward end of the casing and may be provided with an adjusting knob 105 so as to position the aperture 102 in the proper location with respect to the arc. The lamp housing is shown as of generally octagonal shape contrary to the usual cylindrical shape. A mark 106 may be provided on the ground glass finder for aiding in locating the arc.

There also may be provided the usual shutter 107 for protecting the condenser lens system in striking the arc, etc. As shown, said shutter is in the form of a disc fixed to an arm 108 mounted on a shaft 109 which is rotated by means of crank handle 110.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a high intensity projector, the combination with the positive electrode holder, of means for rotating and feeding the electrode therethrough comprising a slide, means for continuously reciprocating the same, a shaft oscillated thereby, a roller grip clutch on said holder and oscillated by said shaft for gripping the electrode when turned one way and releasing it when turned the other way to rotate the electrode step by step, and means for moving said slide slightly to and fro in the direction of said shaft as it reciprocates whereby the electrode is both rotated and fed.

2. In a high intensity projector, the combination with the positive electrode holder, of means for rotating and feeding the electrode therethrough comprising a slide, means for continuously reciprocating the same, a shaft oscillated thereby, a roller grip clutch on said holder and oscillated by said shaft for gripping the electrode when turned one way and releasing it when turned the other way to rotate the electrode step by step, means for moving said slide slightly to and fro in the direction of said shaft as it reciprocates, and means for varying the extent of said to and fro motion in accordance with the arc length to regulate the feed.

3. In a projector lamp having a main housing, a hinged rear door therefor, a motor on the outside of said door for variable speed drives and ventilating, feeding means also on said door driven by said motor, electrode holders and a common support therefor secured to the inside of said door including a hollow horizontal standard for the cooling air passing from the motor, shafts thereon driven from said variable speed drives for feeding the electrodes, and current introducing brushes on said holders, said support having vents therein for cooling said brushes and holders.

4. In a projector lamp, a lamp housing, a feeding and ventilating motor at the rear thereof, spaced electrode holders, a hollow horizontal standard for supporting said electrode holders and having vents therein for cooling said holders, a projector lens, and a forward nozzle-like part on said standard for directing air on said lens to cool the same.

THEODORE O. HALL.